(12) United States Patent
Herklotz

(10) Patent No.: US 6,484,383 B1
(45) Date of Patent: Nov. 26, 2002

(54) METHOD OF AIRTIGHT BONDING OF TWO MEMBRANES

(75) Inventor: Martin Herklotz, Heusenstamm (DE)

(73) Assignee: Fresenius Medical Care Deutschland GmbH, Bad Homburg (DE)

(*) Notice: Subject to any disclaimer, the term of this patent is extended or adjusted under 35 U.S.C. 154(b) by 0 days.

(21) Appl. No.: 09/281,195

(22) Filed: Mar. 30, 1999

(30) Foreign Application Priority Data

Mar. 30, 1998 (DE) .......................................... 198 14 101

(51) Int. Cl.⁷ ............................ F04B 43/06; G01L 27/00
(52) U.S. Cl. .............................. 29/446; 261/DIG. 37; 73/1.67; 417/395
(58) Field of Search .............................. 156/580, 583.3, 156/295, 285, 87, 382; 261/DIG. 37; 73/1.66, 1.67; 417/395

(56) References Cited

U.S. PATENT DOCUMENTS

| | | | |
|---|---|---|---|
| 3,322,598 A | * 5/1967 | Marks et al. | 156/382 |
| 4,014,091 A | * 3/1977 | Kodera et al. | 145/322 |
| 4,222,127 A | 9/1980 | Donachy et al. | |
| 4,332,254 A | * 6/1982 | Lundquist | 606/194 |
| 4,468,222 A | * 8/1984 | Lundquist | 417/236 |
| 5,282,849 A | 2/1994 | Kolff et al. | |
| 5,286,329 A | * 2/1994 | Iijima et al. | 156/297 |
| 5,300,170 A | * 4/1994 | Donohoe | 156/235 |
| 5,494,546 A | * 2/1996 | Horvath | 156/102 |

FOREIGN PATENT DOCUMENTS

| | | |
|---|---|---|
| DE | 4315962 | 10/1994 |
| DE | 44 19 593 A1 | 12/1995 |
| EP | 0 130 441 A2 | 1/1985 |
| EP | 0 690 232 A1 | 1/1996 |

* cited by examiner

*Primary Examiner*—Michael W. Ball
*Assistant Examiner*—Barbara J Musser
(74) *Attorney, Agent, or Firm*—Kenyon & Kenyon

(57) ABSTRACT

A method for airtight joining of two membranes. An airtight and complete bonding of the two membranes is achieved by first producing a curvature in one of the membranes, then placing the convexly curved side of a membrane onto the membrane to be joined to it in an airtight manner, next joining the two membranes until the edge areas of the membranes are in contact, and finally applying a pressing force that seals the edge areas of the membranes in an airtight manner.

14 Claims, 1 Drawing Sheet

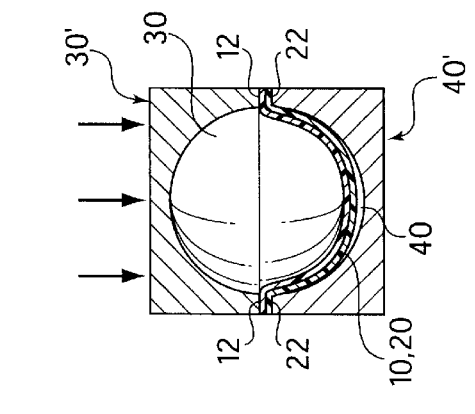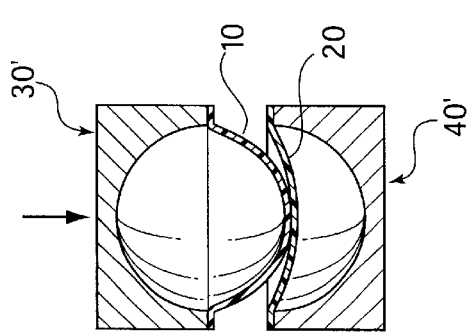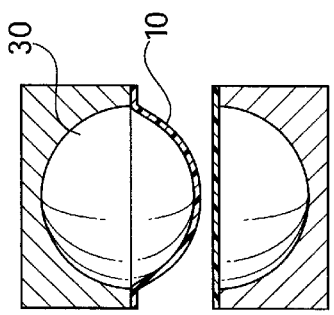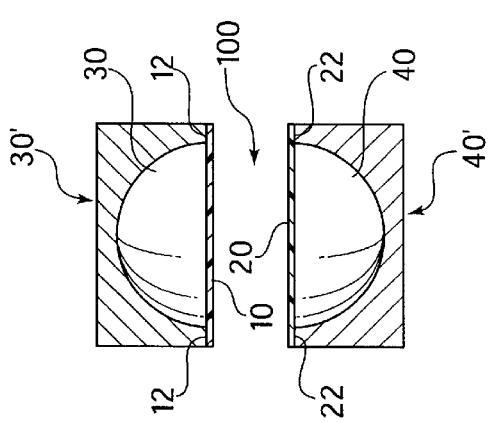

METHOD OF AIRTIGHT BONDING OF TWO MEMBRANES

FIELD OF THE INVENTION

The present invention relates to a method of airtight bonding of two membranes.

BACKGROUND OF THE INVENTION

The problem of bonding two membranes together in such a way as to minimize the space remaining between the membranes and seal it with respect to the medium surrounding the membranes is known from the field of pressure sensors, for example. German Patent No. 4 419 593 A1 discloses a pressure sensor arranged in a pressure measurement chamber suitably positioned in the tube or channel through which a liquid or gas is flowing. The pressure measurement chamber has an opening in which a membrane is stretched evenly by means of a tension device and is deflected according to the pressure prevailing in the flowing fluid. In the area of the membrane affected by pressure fluctuations in the fluid, a pressure transmitting part also composed of a membrane is arranged to respond to the movements on the membrane on which the pressure is acting. Airtight bonding of the two membranes is accomplished by pressing them at their edge areas so as to minimize the space remaining between the membranes.

European Patent No. 130 441 describes a device whereby a membrane on which pressure is applied is completely bonded to a membrane of a pressure measurement device by exhausting the air between the two membranes by using a vacuum pump. Such a device makes it possible to measure overpressures and negative pressures due to the tight contact between the two membranes, but it has the disadvantage that means must constantly be provided for creating a vacuum in order to guarantee reliable operation of the device.

OBJECT OF THE INVENTION

The object of the present invention is to make available a simple method of airtight and complete bonding of two membranes.

This object is achieved according to the present invention by the fact that the method includes the steps of producing a convex curvature in one of the membranes, placing the membrane having the convex curvature on the membrane to be bonded to it in an airtight manner, joining the membranes until the edge areas of the membranes are in contact and applying a pressing force that seals the membranes with an airtight seal in the edge area. Such a method makes it possible to completely displace the air between the two membranes and prevent the admission of air. This is achieved by pressing the convex curvature of the bulging membrane into the other membrane when they are joined, thereby gradually displacing the air between the two membranes. The joining of the membranes is performed until the membranes are ultimately in contact even in their edge areas. To prevent admission of air from the area surrounding the membranes, a pressing force is applied according to the present invention after the membranes are joined, causing the membranes to be sealed airtight in their edge areas. This yields the advantage that an airtight connection as well as a complete bonding of the membranes is achieved, resulting in a reliable bonding when there is an overpressure or a negative pressure, and thus providing synchronized movement of the membranes.

In contrast with planar contact between two membranes, the convex curvature of one of the membranes achieves the result that the possibility of an air cushion remaining in the area between the membranes after the edge area has been joined and pressed together is ruled out. According to the present invention, the air is displaced between the membranes due to the fact that at first the joining of the two membranes does not take place over the entire cross-sectional area but instead at the beginning of joining only in a protruding area of the membrane created by the curvature.

In another embodiment of the present invention, a first membrane borders a first chamber of a membrane unit of a metering pump to accommodate a working fluid, and a second membrane borders a second chamber to accommodate a fluid that is to be delivered, with the convex curvature in the first membrane being produced by increasing the pressure on the working fluid in the first chamber. It is thus possible to join the membrane of a pump head of a diaphragm pump in an airtight and complete manner to the membrane of the pump bordering the working fluid. To that effect, the pressure of the working fluid is increased slightly due to the movement of a piston, for example, thus resulting in a convex curvature of the membrane bordering the working fluid. The membrane of the pump head is joined to the convexly curved first membrane by the method according to the present invention, after which the bulging membrane is placed on the membrane of the pump head to which it is to be joined, both membranes being joined together until their edge areas are joined, whereupon a pressure force is applied, sealing the membranes and making them airtight in the edge area.

It is especially advantageous if the second chamber is filled with a fluid before joining the two membranes, and if it is emptied completely or partially by the joining of the membranes. The second chamber may be filled with a liquid or, for example, a gas under pressure which is forced out of the second chamber during the joining in accordance with the convex curvature of the first membrane.

In a further embodiment of the present invention, the two chambers are positioned and joined by a guide. In particular, this facilitates precise placement of the bulging membrane onto the membrane to which it is to be joined with an airtight seal in the desired position. Furthermore, joining the two chambers with the help of a guide further ensures that the edge areas of the membranes will be in precise contact so that this will ensure that an airtight connection is established in the entire edge area of the membranes.

In another embodiment of the present invention, it is possible for each chamber to be arranged in a housing part and to be held together by a tension device arranged on the housing parts with the desired pressure after joining. This can ensure that a pressure adequate to achieve an airtight connection will be applied to the edge areas of the membranes.

The curvature of one of the membranes can be increased while joining the two membranes. Thus, a displacement of the air between the two membranes and an increase in the contact area between them are achieved not only by joining them but also by increasing the curvature of one of the membranes. For example, if one membrane of one diaphragm pump head is to be joined to the membrane of the diaphragm pump bordering the working fluid, then the pressure may be increased in the working fluid after the membrane that already has a curvature has been positioned and during the joining of the two membranes so that the convex curvature in the first membrane is increased.

In a further embodiment of the present invention, the curvature in the membrane is designed in such a way that the membrane to be joined to it is mostly or completely deflected after the two membranes have been joined. What is achieved in an especially reliable manner is that air between the two membranes is displaced before the edge areas of the membranes are joined together. The convex curvature of the membrane may be formed completely during the positioning of the membrane or it may be increased during the joining.

Additional advantages and details of the present invention are explained in greater detail below on the basis of an embodiment illustrated in the drawings.

BRIEF DESCRIPTION OF THE FIGURES

FIG. 1 is a schematic diagram of the method according to the invention for airtight and complete joining of two membranes of a diaphragm pump.

DETAILED DESCRIPTION OF THE PREFERRED EMBODIMENT

FIG. 1a shows a housing 30' of a diaphragm pump in which a chamber 30 is arranged. Chamber 30 is bordered by a membrane 10 and contains a suitable working medium for the diaphragm pump according to the present embodiment, such as oil, for example. FIG. 1a also shows a housing 40' having a chamber 40 arranged in it, being itself bordered by a membrane 20. Chamber 40 contains any desired medium to be pumped by the diaphragm pump, such as a dialysis fluid. Housing 40' represents the head of the diaphragm pump and has connections (not shown here) for supplying and removing the medium to be pumped. Housing 40' may be designed, for example, as a disposable item which can be replaced each time the diaphragm pump of a dialysis machine such as a peritoneal dialysis machine, is used.

FIG. 1a shows membranes 10, 20 in a starting state, separated by an interspace 100, at a time before use of the method according to the present invention. Membranes 10, 20 are joined to housing parts 30', 40' at edge areas 12, 22.

FIG. 1b shows the membrane 10 in a convexly curved state, which can be produced by increasing the pressure on the working medium inside chamber 30. This may be accomplished, for example, by accordingly moving the piston of a piston unit that is connected to the diaphragm pump.

FIG. 1c shows the state of the two membranes 10, 20 after the convex membrane 10 has been placed on membrane 20, which is to be joined to it in an airtight and complete manner. The convex membrane 10 can first be centered on membrane 20 and then housing parts 30', 40' are joined. This causes membrane 20 to move inward in a concave pattern and thus causes air between the two membranes 10, 20 to move radially outward. Thus, the contact area between the two membranes 10, 20 is increased when the membranes are joined, and can be reliably kept free of air.

Before positioning the convex membrane 10, membrane 20 may have a flat design, or it may have a slight concave or convex curvature, but the curvature should be smaller than the convex curvature of membrane 10.

FIG. 1d shows the two membranes 10, 20 which are in contact with one another over their cross-sectional areas and also in their edge areas 12, 22 after being joined. Due to the gradual joining of the two membranes 10, 20, the contact area between membranes 10, 20 is freed of air. Joining the edge areas 12, 22 and applying the pressing force effectively prevents air from being admitted into the space between membranes 10, 20.

After the two housing parts 30', 40' have been joined, an air-free and complete connection of the two membranes 10, 20 can be achieved, resulting in membrane 20 of housing part 40' following the movement of membrane 10 under overpressure as well as negative pressure. This makes it possible to accurately guide the volume of the fluid to be conveyed into chamber 40 or accurately remove the fluid from this chamber, corresponding to the moved volume of working fluid in chamber 30. According to this invention, it is possible to reliably rule out any effect or entrance of air between membranes 10, 20, which would, on the one hand, reduce the metering accuracy of the device due to the compressibility factor and, on the other, also prevent intake of media to be pumped due to the lack of a vacuum.

In particular, the method according to the invention makes it possible to dispense with the use of vacuum pumps when joining membranes, which simplifies the suitable devices as well as the method to be used.

What is claimed is:

1. A method of airtight joining first and second flexible membranes comprising the steps of:

a) producing a curvature in a first membrane by increasing the pressure on the first membrane;

b) contacting the convex surface of the first membrane with a second membrane;

c) pressing the convex surface of the first membrane into the second membrane to produce a concave surface in the second membrane;

d) joining the first and second membranes, at least in part by increasing the curvature of the first membrane, until the edges of the first and second membranes come into contact; and e) pressing together the first and second membranes to seal the edge area of the first membrane to the edge area of the second membrane and form an airtight seal between the two membranes.

2. The method according to claim 1, wherein the first membrane borders a first chamber containing a working fluid and the second membrane borders a second chamber to accommodate a fluid to be-pumped, and wherein the curvature in the first membrane is produced by increasing the pressure on the working fluid.

3. The method of claim 2, wherein the first chamber is part of a metering pump.

4. The method of claim 2, wherein the second chamber is filled with fluid before the first and second membranes are joined.

5. The method of claim 4, wherein at least a portion of the fluid is emptied from the second chamber when the first and second membranes are joined.

6. The method of claim 1, wherein a guide is provided for positioning the first and second membranes.

7. The method of claim 2, wherein the first and second chambers are provided in first and second housings respectively.

8. The method of claim 7, wherein a tension device is provided on the first and second housings for maintaining the airtight seal after the first and second membranes have been joined.

9. The method of claim 1, wherein the curvature of the first membrane causes complete deflection in the second membrane during the joining of the two membranes.

10. The method of claim 8, wherein the tension device prevents the admission of air between the first and second membranes.

11. The method of claim 2, wherein the working fluid is an oil.

12. The method of claim 2, wherein the fluid to be pumped is a dialysis fluid.

13. The method of claim 2, wherein the second chamber is filled with a gas before the first and second membranes are joined.

14. The method of claim 13, wherein at least a portion of the gas is emptied from the second chamber when the first and second membranes are joined.

* * * * *